(12) United States Patent
Frahn et al.

(10) Patent No.: US 11,827,787 B2
(45) Date of Patent: Nov. 28, 2023

(54) THERMOPLASTIC ELASTOMER COMPOSITION

(71) Applicant: ACTEGA DS GMBH, Bremen (DE)

(72) Inventors: Jörg Frahn, Wesel (DE); Olga Weber, Wesel (DE)

(73) Assignee: ACTEGA DS GMBH, Bremen (DE)

( * ) Notice: Subject to any disclaimer, the term of this patent is extended or adjusted under 35 U.S.C. 154(b) by 265 days.

(21) Appl. No.: 17/413,694

(22) PCT Filed: Dec. 12, 2019

(86) PCT No.: PCT/EP2019/084843
§ 371 (c)(1),
(2) Date: Jun. 14, 2021

(87) PCT Pub. No.: WO2020/126804
PCT Pub. Date: Jun. 25, 2020

(65) Prior Publication Data
US 2022/0010132 A1 Jan. 13, 2022

(30) Foreign Application Priority Data

Dec. 20, 2018 (EP) .................................. 18214330

(51) Int. Cl.
| | | |
|---|---|---|
| C08L 75/08 | (2006.01) | |
| B29C 45/00 | (2006.01) | |
| C08L 53/02 | (2006.01) | |
| C08L 91/00 | (2006.01) | |
| B29K 19/00 | (2006.01) | |

(52) U.S. Cl.
CPC .......... C08L 75/08 (2013.01); B29C 45/0001 (2013.01); C08L 53/02 (2013.01); C08L 91/00 (2013.01); B29K 2019/00 (2013.01); C08L 2203/30 (2013.01); C08L 2205/035 (2013.01); C08L 2207/04 (2013.01); C08L 2207/322 (2013.01)

(58) Field of Classification Search
CPC ........ C08L 75/08; C08L 53/02; C08L 53/025; C08L 2205/03; C08L 67/00; C08L 67/025
See application file for complete search history.

(56) References Cited

U.S. PATENT DOCUMENTS

| | | | |
|---|---|---|---|
| 5,149,589 A | | 9/1992 | Naritomi et al. |
| 5,476,507 A | * | 12/1995 | Wakabayashi ......... D04B 21/18 |
| | | | 623/1.53 |
| 5,525,675 A | * | 6/1996 | Masuda ................... C08L 23/12 |
| | | | 525/193 |
| 8,071,220 B2 | | 12/2011 | Abraham et al. |
| 2002/0049277 A1 | * | 4/2002 | Yabe .................... F16C 33/6622 |
| | | | 384/462 |
| 2016/0272813 A1 | | 9/2016 | Wiederhirn et al. |
| 2017/0190897 A1 | | 7/2017 | Vetter et al. |
| 2020/0354619 A1 | * | 11/2020 | Uchida ................... C08L 53/02 |

FOREIGN PATENT DOCUMENTS

| | | |
|---|---|---|
| DE | 102007027156 A1 | 12/2008 |
| DE | 102013018101 A1 | 4/2015 |
| DE | 102014007211 A1 | 11/2015 |
| EP | 2106414 B1 | 8/2014 |
| JP | 2001316574 A | 11/2001 |
| JP | 2002309078 A | 10/2002 |
| WO | 9919406 A1 | 4/1999 |
| WO | 200155257 A1 | 8/2001 |
| WO | 2007140127 A1 | 12/2007 |

OTHER PUBLICATIONS

Iiljima et al., electronic translation of JP 2001316574 (Nov. 2001).*
Third Party Observation for European Application No. 20190816753 dated Jan. 17, 2022.
International Search Report and Written Opinion for International Application No. PCT/EP2019/084843, dated Feb. 12, 2020 (10 pages).
Third Party Observation for European Application No. 22196848.0 dated Jun. 23, 2023.
Additional translation of tables from JP20031316574.
Dupont, Hytrel Thermoplastic Polyester Elastomer, Produdct Reference Guide, 2015.
Toyobo MC Corporation, Polyester Elastomer PELPRENE Brochure, date unknown.

* cited by examiner

Primary Examiner — Jeffrey C Mullis
(74) Attorney, Agent, or Firm — Fitch, Even, Tabin & Flannery, LLP

(57) ABSTRACT

The invention relates to a thermoplastic elastomer composition comprising a mixture of a. 5-50 wt. % of a block copolymer type thermoplastic polyurethane elastomer (TPE-U) b. 5-50 of a block copolymer type thermoplastic co-polyester elastomer (TPE-C), and c. 10-60 wt. % of a thermoplastic styrenic block copolymer (TPE-S), wherein the wt. % is based on the total content of the elastomer composition. The elastomer composition might be efficiently connected with polar polymers so that corresponding polymer articles are formed.

18 Claims, No Drawings

THERMOPLASTIC ELASTOMER COMPOSITION

The invention relates to a thermoplastic elastomer composition, an article containing it and to a method of preparing the article.

Thermoplastic elastomers (TPEs) combine the rubber-elastic properties of elastomers with the advantageous processing properties of thermoplastics. There are two different basic types of TPEs, the block copolymer class (block copolymer type TPEs) on the one hand and the blends (blend type TPEs) on the other hand. The blends are a physical mix of polymers which exhibit simultaneous thermoplastic and elastomeric properties. Typically, these blends are a mixtures of thermoplastic and elastomer polymers. The copolymer types combine the molecular elements (within one polymer) which are important for the provision of the thermoplastic and the elastomeric properties.

While most elastomers are thermosets, thermoplastics are in contrast relatively easy to use in manufacturing, for example, by injection molding. Thermoplastic elastomers (TPEs) show advantages typical of both rubbery materials and plastic materials. The benefit of using thermoplastic elastomers is the ability to stretch to moderate elongations and return to its near original shape creating a longer life and better physical range than other materials.

Thermoplastic elastomers generally comprise a thermoreversible network. There are six generic classes of commercial TPEs: Styrenic block copolymers, thermoplastic polyolefine elastomers, thermoplastic vulcanizates, thermoplastic polyurethanes, thermoplastic copolyester and thermoplastic polyamides.

The simultaneous combination of thermoplastic and elastomeric properties opens up to the TPE materials a plurality of applications such as for example in the interiors and exteriors of cars, for industrial devices, industrial tools, household devices, medical consumables and devices, hygiene articles such as toothbrushes, sports goods, bathroom fittings, toys, containers for food, to name only a few. The TPE materials acquire properties such as sealing and damping functions or are used for reasons relating to their pleasant feel and visual appearance. In many of the above-named fields of application, there is the requirement to combine a thermoplastic elastomer with another class of material such as thermoplastic materials, ceramic materials, glass or metal, in a permanent, firmly bonded manner. At the same time, it is required that adhesives or primers be dispensed with, and also that the possible design freedom of the component to be produced be maximized. The aim is the combination of rigid elements with flexible elements in a single assembly or finished part. This is frequently accompanied by a cost reduction, for example through reducing production steps, reducing weight, shortening production times and/or low structural complexity of the individual and finished parts. TPEs have advantages as a flexible element in processing and like thermoplastics they can be processed simply, cost-effectively and by means of widely used technologies.

A successful bond between TPEs and another material is essentially dependent on the kind of the TPE surface and the counter surface of the other material.

TPEs modified for adhesion to polar substrates are well established, and methods to improve adhesion like the modification of the surface of the substrate with plasma or electron beam or the use of an adhesion coating or a primer, are well known in industry. US 20160272813 describes TPE containing polymer blends which show good adhesion abilities to other thermoplastic polymers. U.S. Pat. No. 8,071,220 describes thermoplastic elastomer (TPE) compositions having improved adhesion to polar polymer substrates, without requiring pre-treatment of the substrate surface or the use of additional adhesives. However, the above described TPE containing compositions do not have appropriate material abilities for many applications. Furthermore, the relevant adhesion to polar polymers is generally improvable.

The object of the present invention is to provide a high-quality thermoplastic elastomer and a polymeric article containing the thermoplastic elastomer and a polar polymer. The thermoplastic elastomer and the polar polymer should be directly connected with each other. The polymeric article should be economically attractive and easily to produce with the proviso that a good adhesion between the thermoplastic elastomer and the polar polymer is formed.

The solution according to the present invention is a thermoplastic elastomer composition comprising, or consisting of, a mixture of
a. 5-50 wt. % of a block copolymer type thermoplastic polyurethane elastomer (TPE-U)
b. 5-50 wt. % of a block copolymer type thermoplastic co-polyester elastomer (TPE-C), and
c. 10-60 wt. % of a thermoplastic styrenic block copolymer (TPE-S), wherein the wt. % is based on the total content of the elastomer composition.

Thermoplastic elastomers are well known and are described e.g. in the "Handbook of Thermoplastic Elastomers, J. G. Drobny, William Andrew publishing, 2007". However, it should be pointed out that the above mentioned mixture ingredients TPE-U, TPE-C and TPE-S each include exclusively copolymer types of the relevant TPE class. Thus, it should be clarified:

The thermoplastic styrenic block copolymer (TPE-S) according to the present invention is a copolymer containing two hard blocks and one soft block between the two hard blocks. Said hard blocks each contain styrene and/or styrene derivatives which are represented by α-methylstyrene and/or ring-substituted styrenes. The soft block contain structural units of diene and/or hydrogenated dienes. TPE-S are generally producible via polymerization. TPE-S according to the present invention do not contain urethane groups.

The block copolymer type thermoplastic polyurethane elastomer (TPE-U) according to the present invention is a copolymer containing alternating hard segments and soft segments. Said hard segments contain urethane groups and the soft segments contain ether, ester and/or carbonate groups. The soft segments are linked by urethane groups with the hart segments. TPE-U are generally producible via polyaddition.

The block copolymer type thermoplastic co-polyester elastomer (TPE-C) according to the present invention is a copolymer containing hard blocks and soft blocks, where said hard blocks contain ester groups and the soft blocks contain ester and/or ether groups. TPE-C according to the present invention do not contain urethane groups and no structural units of styrene or styrene derivatives. TPE-C are generally producible via polycondensation (step-growth-polymerisation).

The thermoplastic elastomer composition according to the invention has excellent adhesion to polar polymers. No particular pre-treatment of the relevant surfaces is required to achieve the adhesion. The thermoplastic elastomer compositions according to the invention exhibit very good adhesion on polyethylene terephthalates (PET), acrylonitrile-butadiene-styrene polymers (ABS), polycarbonates (PC), polyamides (PA) or blends of these. The use of adhesion promoters (so-called primers) or adhesives can be dispensed with. Constructive aids in the case of components such as for example bars, cavities, recesses and holes can also be dispensed with. The advantages of the materials according to the invention thus clearly increase the design and process freedom for design engineers. Furthermore, the final substrates are easy to process, in particular in an injection moulding process, and no pre-treatment of the surfaces is required.

In case a sufficient amount of TPE-S is present in the mixture it is typical that TPE-U and TPE-C provide in its combination synergistic adhesion properties regarding polar polymers. The combination of TPE-C and TPE-U in the presence of TPE-S further allows to avoid problems which are often observed in connection with the processing of pure TPE-U (e.g. a low melt flow). However, the addition of TPE-C does not deteriorate the positive abilities like the attractive mechanical properties and the chemical resistance.

A corresponding blend containing TPE-U, TPE-C and TPE-S provides compatibility and attractive mechanical abilities, especially regarding elasticity. The inherent compatibilizing effect is important in order to avoid phase separation and to increase the shelf life of the final polymer product by providing a stable mixture. The inherent plasticizing effect of the blend might be so strong that no additional softeners are required. For many applications especially in the health and food area this fact is important because a migration of (especially low molecular weight) plasticizers has to be strictly avoided. In this respect the possible absence of further plasticizers provides the basis for acquiring corresponding food contact certificates. Furthermore, it should be mentioned that attractive haptic abilities (like for handles) are achieved by combining TPE-U, TPE-C and TPE-S as mixture ingredients. In the practice a shore hardness of A45-A90 might be adjusted which is especially important for applications which require a so called soft-touch-haptic.

The thermoplastic elastomer composition of the present invention provides also positive properties in connection with its processing. At the generally used processing temperatures the composition has a suitable melt flow.

Additionally it should be mentioned that each of the components TPE-U, TPE-C and TPE-S are commercially available and (relative) low-priced polymers which is important regarding the economic efficiency of the elastomer composition.

Normally, the thermoplastic elastomer composition of the present invention has a shore hardness (measured at room temperature) in the range from A20 up to D50, preferably a shore hardness of A45-A90 (ASTM D 2240, 5 s).

Such a shore hardness of A45-A90 provides that the relevant articles have soft and elastic properties. Often articles require a softer hand feel, such as toothbrush handles. The above defined shore hardness is important in order to ensure such a softer hand feel. Such a shore hardness provides the further advantage that the relevant articles have corresponding elastic properties. The thermoplastic elastomer composition of the present invention also shows positive properties in connection with the compression set. Such a retained shape after mechanical stress is a further important quality property.

In an preferred embodiment the sum of the contents of the TPE-U, TPE-C and the TPE-S in the elastomer composition is 40-100 wt. %, typically 45-95 wt. %.

Typically, the sum of the contents of the TPE-U and the TPE-C in the elastomer composition is 30-60 wt. %, preferably 35-50 wt. %. This is generally beneficial regarding the adhesion properties. However, values of higher 50 wt. % are often deemed to be not so economical beneficial. Furthermore, values of higher 50 wt. % normally deteriorate the processing abilities (e.g. regarding tackiness and moldability) of the material.

In one embodiment of the invention the proportion of the contents of the TPE-U and the TPE-C in the elastomer composition is 1:5-5:1, preferably 1:3-3:1.

Often, the content of the TPE-S in the elastomer composition is 22-50 wt. %. A corresponding value of at least 22 wt. % especially in the absence of additional softeners (especially oils) provides a better compression set, a higher elasticity and a more attractive hand feel ("soft-touch"). A sufficiently high content of TPE-S generally becomes more important if no additional softeners like oils are used.

The elastomer composition typically contains further ingredients, preferably selected from the groups of compatibilizers, polyolefines, plasticizers and/or fillers.

Polyolefines might be especially used as further ingredients in order to increase the hardness of the mixture. However a too high amount of polyolefines might deteriorate the compatibility (phase separation). Thus, the polyolefine amount should be limited accordingly. Consequently, the mixture of the thermoplastic elastomer composition of the present invention might contain normally (additionally) up to 30 wt. % polyolefines. These polyolefines might be provided by thermoplastic polyolefines. Typically these thermoplastic polyolefines are provided by polyolefin mixtures containing non-cross-linked and/or slightly cross-linked polyolefins (TPE-O) and cross-linked or also vulcanized polyolefins (TPE-V). Often the structural units of said thermoplastic polyolefines are based on monomers having 2-8 carbon atoms, like ethylene, propylene, 1-butene, isobutylene, 1-pentene or 1-hexene. Commercially available species of such thermoplastic polyolefines are Moplen®, Adstif®, Mosten®, Dupure®, Vistamaxx® or Engage®.

The mixture of the elastomer composition of the present invention might also contain the following ingredients: antistatics, antifoaming agents, lubricants, dispersants, separating agents, anti-blocking agents, radical scavengers, antioxidants, biocides, fungicides, UV stabilizers, other light stabilizers, metal deactivators, furthermore also additives such as foaming adjuvants, expanding agents, adhesives, anti-fogging adjuvants, dyes, color pigments, color master batches and viscosity modifiers/softeners.

The following are for example mentioned as fillers: kaolin, mica, muscovite, calcium sulfate, calcium carbonate, barium sulfate, silicate, silica, talc, carbon black, graphite or synthetic fibers.

Suitable compatibilizers are e.g. resins of hydrocarbons like ESCOREZ®, REGALITE® or REGALREZ®. Graft polymers are further types of suitable compatibilizers which normally have a backbone containing polypropylene, polyethylene, styrene block copolymers, polypropylene-polyethylene-copolymers or poly-alpha-olefines. Relevant commercially available species of such are Scona® or Lotryl®.

Suitable softeners might be paraffin oils or softener types which are used in the PVC processing like citrates or phalates. Normally, corresponding oils are used in order to support the processing of the composition. However, a high oil content typically reduces the adhesion properties and provides also disadvantages concerning food compatibility. Thus, in many cases the composition of the present invention does not contain (processing) oil or alternatively only a relative small amount of oil which is below 15 wt. % based on the total content of the elastomer composition. Especially in such cases the content of the TPE-S in the elastomer composition should be preferably 22-50 wt. %. A corresponding value of at least 22 wt. % is normally advantageous in order to compensate a low oil content.

The preparation of the mixture of the elastomer composition of the present invention is simple. The mixture can be made in batch or continuous operations. Mixing in a continuous process typically occurs in an extruder that is elevated to a temperature that is sufficient to melt the polymer matrix with addition of all additives. Subsequent extrusion or molding techniques are well known to those skilled in the art of thermoplastics polymer engineering.

Typically at least 70 wt. % of the TPE-U is represented by TPE-U having a linear structure.

TPE-Us according to the invention typically consist of linear, statistically constructed polyurethanes with alternating hard, crystalline and soft, amorphous segments. For example, 4,4'-diphenylmethane diisocyanate (MDI), hexamethylene diisocyanate (HDI), H12-MDI are used as diisocyanate, wherein MDI is preferred. The hard segments are built up of polymers of diisocyanates and short-chain chain extenders which are linked to each other via urethane groups.

As diisocyante 4,4'-Diphenylmethandiisocyanat (MDI), Hexamethylendiisocanat (HDI), H12-MDI might be used, where MDI is preferred. As chain extender short chain diols might be used like ethylene glykol, diethylene glykol, 1,4-butane diol, 1,6-hexane diol.

Preferred as chain extenders are diethylene glycol and 1,4-butane diol, especially 1,4-butane diol. The soft segments typically consists of long chain polyether diols or polyester diols.

Appropriate polyether diols might be polyethylene glycol, polypropylene glycol, polyethylene-co-propylene glycol or polytetramethylene glycol, preferably polytetramethylene glycol.

Polyester diols usually contain structural units of alkane dicarboxylic acids, preferably adipic acid and alkane diols like ethylene glycol, 1,4-butane diol, 1,6-hexane diol. Additionally also structural units of polycaprolactone diols or aliphatic polycarbonate diols might be used in the soft segments.

The soft segments are linked via urethane groups to the hard segments.

Suitable TPE-U types are for example:
TPU-ARES: aromatic hard segments, polyester-soft segments
TPU-ARET: aromatic hard segments, polyether-soft segments
TPU-AREE: aromatic hard segments, soft segments with ether- and ester-groups
TPU-ARCE: aromatic hard segments, polycarbonate soft segments
TPU-ARCL: aromatic hard segments, polycaprolactone-soft segments
TPU-ALES: aliphatic hard segments, polyester-soft segments
TPU-ALET: aliphatic hard segments, polyether-soft segments Normally at least 70 wt. % of the TPE-C is represented by TPE-C comprising a block copolymer of alternating hard and soft blocks, where the soft blocks contain ester and ether linkages and structural units of aromatic dicarboxylic acids.

TPE-Cs of the present invention are typically linear multiblock polyesters with statistical distribution of high-melting-point, hard polyester blocks and low-melting-point, soft polyester blocks. The hard blocks form crystalline areas, and the soft blocks form amorphous areas which determine the elastic behavior at the usage temperatures of the TPE-Cs. The hard polyester blocks are built up of short-chain dicarboxylic acids with fewer than 4 carbon atoms or aromatic dicarboxylic acids or mixtures of dicarboxylic acids. Aromatic dicarboxylic acids are preferred, isophthalic acid or terephthalic acid are particularly preferred. The alcohol component is preferably likewise difunctional and consists of short-chain alkyl diols or short-chain polyoxyalkylene diols with fewer than 3 repeat units or mixtures of different diols. Short-chain diols such as ethylene glycol, 1,3-propanediol, 1,4-butanediol, 1,4-cyclohexanedimethanol are preferred; 1,4-butanediol is particularly preferred. The soft polyester blocks consist of aliphatic or aromatic dicarboxylic acids, preferably of aromatic dicarboxylic acids, quite particularly preferably of isophthalic acid or terephthalic acid. In order to produce soft areas in the case of the TPE-Cs, different diol types are used, polyether diols such as polyethylene glycols, polypropylene glycols, polyethylene-co-propylene glycols, polytetramethylene glycols or soft polyester diols built up of alkanedicarboxylic acids, for example adipic acid or sebacic acid, and alkane diols, or polycaprolactone diols or aliphatic polycarbonate diols. However, mixtures of diols can also be used. Hard TPE-C areas often built up of terephthalic acid and short-chain diols, particularly preferably 1,4-butanediol, are preferred, combined with soft areas, preferably built up of terephthalic acid and polyether diols, quite particularly preferably of polytetramethylene glycol.

Suitable TPE-C types are for example:
TPC-EE: soft segments with ether- and ester-bonds
TPC-ES: containing polyester-soft segments
TPC-ET: containing polyether-soft segments Often at least 90 wt. % of the styrenic block copolymer (TPE-S) is represented by a A-B-A triblock copolymer wherein the A block contains styrene structural units and the B block contains structural units of butadiene, isoprene and/or isobutene.

Typical TPE-S according to the invention are A-B-A triblock copolymers wherein the A block is usually polystyrene and the B block is usually made up of polybutadiene, polyisoprene or polyisobutene (SBS, SIS, SiBS). Alternatively, in the A block the styrene monomers can be partially or completely replaced with α-methylstyrene and/or ring-substituted styrenes. Typical ring-substituted styrenes are ring-alkylated styrenes like p-methylstyrene, tert-butylstyrene, ethylstyrene, isopropylstyrene, tert-butylstyrene, 2,4-di methylstyrene, diethylstyrene, o-methyl-p-isopropylstyrene but also halostyrenes such as chlorostyrene, fluorostyrene and iodostyrene, and other types like 2,4-cyanostyrene, hydroxystyrene, nitrostyrene, aminostyrene and/or phenylstyrene.

The B block can also alternatively contain mixtures of dienes such as SIBS (B block of a mixture of butadiene and isoprene). Furthermore, TPE-S consisting of styrene and diene monomers can also be used as hydrogenated derivatives. The B block units are present partially or completely hydrogenated. Polystyrene-block-poly(ethylene-co-butylene)-block-polystyrene (SEBS) and polystyrene-block-poly (ethylene co-(ethylene-propylene))-block-polystyrene (SEEPS) may preferably be named here. In addition to triblock, di-, tetra- or multi-block copolymers of named monomers of styrene, styrene derivatives (A blocks) and butadiene, isoprene, isobutylene and mixtures thereof (B blocks) in different sequencing of A and B blocks (for example B-A-B, A-B-A-B, etc.) can also be used as an alternative. Preferred TPE-S are A-B-A triblock copolymers.

Suitable TPE-S types are for example:
TPS-SBS: styrene/butadiene block-copolymer
TPS-SIS: Styrene/isoprene block-copolymer
TPS-SEBS: styrene/ethane buten/styrene-block-copolymer
TPS-SEPS: styrene/ethenpropene/styrene-block-copolymer
TPS-SEEPS: styrene/isoprene hydrogenated/butadiene hydrogenated/styrene-block-copolymer The present invention is also directed to an article containing two different polymeric materials which are directly connected with each other, characterized in that one of the polymeric materials is provided by the thermoplastic elastomer composition according to the present invention which is described above.

In a preferred embodiment the other polymeric material comprises polar polymer. Preferably, the other polymeric material does not contain, and more preferably does not consist of, thermoplastic elastomer according to the present invention.

By polar polymer is meant a polymer which contains other than carbon and hydrogen atoms, preferably oxygen, nitrogen and/or chlorine. Preferred polar polymer is technical polymer available by a technical synthesis.

However, the most preferred polar polymer is provided by polar resins containing significant amounts of atoms other than carbon and hydrogen.

Such polar resins include acrylonitrile-butadiene-styrene polymers (ABS), polyacetals, polyarylates, acrylic-styrene copolymers, acrylonitrile-styrene-acrylic polymers, acrylonitrile-styrene polymers modified with ethylene-propylene rubber, polyester-polyether block copolymers, polyesters such as polybutylene terephthalate and polyethylene terephthalates (PET), and including liquid-crystal polyesters, polyetheramides, polyetheretherketones, polyetherimides, polyethersulfones, ethylene-vinyl alcohol copolymers, polyvinyl chloride, chlorinated polyvinyl chloride, polyvinylidene chloride and fluoride, styrene polymers such as styrene-acrylonitrile copolymers, styrene-butadiene copolymers, styrene-maleic anhydride copolymers copolymerized with styrene alone or with the additional monomers listed for styrene, polyphenylene ether, polyphenylene sulfide, polysulfone, polyurethane, polyamides (PA), i.e., nylons such as nylon 6, nylon 6.6, nylon 6.9, nylon 6.10, nylon 6.12, nylon 11, nylon 12, and amorphous nylons, polyamideimide, polycaprolactone, polyglutarimide, poly(methyl methacrylate), other CI to Cg poly(alkyl(meth)acrylates) and polycarbonates (PC).

Most preferred polar polymers are polycarbonates (PC), polyethylene terephthalates (PET), acrylonitrile-butadiene-styrene polymers (ABS) and polyamides (PA).

Furthermore, the present invention is directed to a method of preparing an article described above, preferably being injection moulding, where the surfaces of the two different polymeric materials which are directly connected with each other are provided without a pre-treatment. This is important concerning the economic attractiveness of the article.

The preferred preparation method is the so called multicomponent injection molding. But also procedures such as encapsulation of insert parts and overmolding of hard components are method alternatives. Furthermore, the adhesion between the two relevant components can also be arranged by pressing e.g. in a heating press or by shaping processes. Also these procedures do not require pre-treatment of the two adhesion partners. Wetting with water-based and solvent-based coating systems by receiving a good adhesion is also possible. However, in the application in connection with coatings and varnishes a prior plasma or corona treatment might be advantageous.

Although the preferred connecting method do not require pre-treatment of the two adhesion partners the provision of degreased and clean surfaces is often advantageous.

Generally, the thermoplastic elastomer composition of the present invention can be applied to a diverse range of substrates. The application encompasses all areas, such as consumer goods, pharmaceuticals and medical devices. The articles according to the present invention might be engineering substrates but which require a softer hand feel, such as knife handles or drill handles.

Below the present invention is described in more detail by using examples.

The tests of numbers 1-21 are according to the present invention and the experiments due to Ref. 1-Ref. 9 are comparison tests which are not according to the present invention.

| Raw materials | Ref. 1 | Ref. 2 | Ref. 3 | Ref. 4 | test 1 | test 2 |
|---|---|---|---|---|---|---|
| TPE-U[1] | 40 | | 45 | | 20 | 33 |
| TPE-C[2] | | 45 | | 40 | 20 | 12 |
| PP[6] | 9.7 | 9.7 | 9.7 | 9.7 | 9.7 | 9.7 |
| TPE-S[11] | 16 | 16 | 16 | 16 | 19 | 16 |
| Oil[7] | 24 | 24 | 24 | 24 | 24 | 24 |
| Compatibilizer[8] | 5 | 2.5 | 2.5 | 5 | 2.5 | 3.2 |
| Compatibilizer[9] | 5 | 2.5 | 2.5 | 5 | 2.5 | 3.2 |
| Shore hardness A | 70 | 77 | 67 | 80 | 65 | 76 |
| Adhesive force [N] ABS | 9 | 23 | 13 | 10 | 62 | 30 |
| Adhesive force [N] PC | 5 | 26 | 11 | 21 | 40 | 23 |

| Raw materials | Ref. 6 | Ref. 5 | test 3 | test 4 |
|---|---|---|---|---|
| TPE-U[4] | 50 | | 25 | 37.5 |
| TPE-C[10] | | 50 | 25 | 12.5 |
| PP[6] | 10.5 | 10.5 | 10.5 | 10.5 |
| TPE-S[3] | 39.2 | 39.2 | 39.2 | 39.2 |
| Shore hardness A | 78 | 86 | 84 | 79 |
| Adhesive force [N] ABS | 37 | 34 | 41 | 49 |
| Adhesive force [N] PC | 11 | 36 | 38 | 70 |

It is shown that the combination of TPE-C and TPE-U in the presence of TPE-S provides a synergistic effect concerning the improvement of the adhesion. For example the comparison of Ref. 3 with test 2 shows that the addition of TPE-C component provides a significant improvement of the adhesion.

| Raw materials | test 5 | test 6 | test 7 | test 8 |
|---|---|---|---|---|
| TPE-U[4] | 30 | 15 | 29 | 44.5 |
| TPE-C[10] | 10 | 45 | 20 | 8 |
| PP[6] | 10.5 | 10.5 | 10.5 | 10.5 |
| TPE-S[3] | 49.2 | 29.2 | 40.2 | 36.7 |
| Shore hardness A | 79 | 82 | 82 | 76 |
| Adhesive force [N] ABS | 29 | 40 | 35 | 35 |
| Adhesive force [N] PC | 34 | 60 | 50 | 70 |

Tests 5-8 show that the compositions according to the present invention generally provide good or even very good adhesion results.

| Raw materials | test | | | | | | | | |
|---|---|---|---|---|---|---|---|---|---|
| | 9 | 10 | 11 | 12 | 13 | 14 | 15 | 16 | 17 |
| TPE-U[4] | 37.5 | 37.5 | 37.5 | 37.5 | 37.5 | 37.5 | 37.5 | 37.5 | 37.5 |
| TPE-C[10] | 12.5 | 12.5 | 12.5 | 12.5 | 12.5 | 12.5 | 12.5 | 12.5 | 12.5 |
| TPE-S[3] | 49.7 | 39.7 | 29.7 | 19.7 | 39.7 | 29.7 | 39.7 | 29.7 | 19.7 |
| chalk[12] | — | 10 | 20 | 30 | — | — | — | — | — |
| talc[13] | — | — | — | — | 10 | 20 | — | — | — |
| kaolin[14] | — | — | — | — | — | — | 10 | 20 | 30 |
| Shore hardness A | 70 | 72 | 75 | 78 | 73 | 78 | 75 | 77 | 81 |
| Adhesive force [N] ABS | 120 | 100 | 120 | 120 | 130 | 115 | 120 | 140 | 120 |
| Adhesive force [N] PC | 100 | 110 | 120 | 140 | 130 | 105 | 120 | 120 | 130 |
| Adhesive force [N] PET | 75 | 70 | 90 | 95 | 100 | 110 | 95 | 95 | 60 |

Tests 9-17 show that also the use of additional mineral ingredients allows a good adhesion. It is further shown that an appropriate shore hardness might be achieved without additional softeners even if relative high amounts of mineral fillers are used.

| Raw materials | test | |
|---|---|---|
| | 18 | Ref. 7 |
| TPE-U[4] | 37.5 | 37.5 |
| TPE-C[5] | 12.5 | 12.5 |
| TPE-S[3] | 10 | 5 |
| chalk[12] | 29.2 | 34.2 |
| PP[6] | 10.5 | 10.5 |
| Shore hardness A | 87-92 | 88-93 |
| Compression set: 22 h-23° C. | 55 | 57 |
| Compression set: 22 h-70° C. | 58 | 61 |
| Compression set: 22 h-100° C. | 92 | 94 |
| Adhesive force PC [N] | 38 | 28 |
| Adhesive force ABS [N] | 90 | 32 |

It is shown that a sufficient amount of TPE-S on the one hand is important for the adhesion and on the other hand provides a positive influence concerning the relevant compression set results.

| Raw material | test | | | | |
|---|---|---|---|---|---|
| | Ref. 8 | Ref. 9 | 19 | 20 | 21 |
| TPE-U[4] | 5.0 | 15.0 | 20.0 | 25.0 | 30.0 |
| TPE-C[10] | 15.0 | 5.0 | 20.0 | 25.0 | 30.0 |
| TPE-S[3] | 69.2 | 69.2 | 49.2 | 39.2 | 29.2 |
| PP[6] | 10.5 | 10.5 | 10.5 | 10.5 | 10.5 |
| Melt flow index/ 190°/10 kg | 6.29 (250° C.) at 190° C. no flow | 4.68 (230° C.) at 190° C. no flow | 4.25 | 41.5 | 32.1 |
| Shore hardness A | 70 | 71 | 82 | 83 | 92 |
| Adhesive force [N] ABS | 9 | 5 | 13 | 40 | 40 |
| Adhesive force [N] PC | 8 | 6 | 19 | 27 | 27 |
| Compression set: 22 h-70° C. | 26 | 35 | 20 | 18 | 26 |
| Compression set: 22 h-100° C. | 40 | 43 | 29 | 26 | 35 |

Ref 8 and 9 (in comparison with tests 19-21) show that the amount of TPE-S should not be too high. In these both comparative experiments melt temperatures of above 200° C. are necessary in order to process the mixture (to have a flow through the processing nozzle). However, such high melt temperatures typically deteriorate the quality of the final product. Furthermore, the adhesion values and the compression set results indicate that the TPE-S amount should not be too high.

Used Raw Materials:

[1] Desmopan® 9370A: TPE-U, manufactured by Covestro Deutschland AG, melt temperature 195-215° C., produced by polyaddition of three basis raw materials: polyol (long chain diol), short chain diol (as chain extender) and diisocyanate; as polyols generally polyesters, polyethers or polycarbonatdiols are used

[2] Riteflex® 435: TPE-C, a product of Celanese Corp., a thermoplastic polyester elastomer with a 35 nominal shore D hardness; a block copolymer which offer a combination of hard and soft segments—providing the desirable properties of thermoset elastomers along with the processing ease of thermoplastics.

[3] Dynasol Calprene® H6174: TPE-S, a hydrogenated rubber (SEBS), a linear structure ethylene-butylene/styrene thermoplastic copolymer, a product of the Dynasol group

[4] Epamould 660 A 26: TPE-U, a transparent, plasticized, polyester based thermoplastic polyurethane with good crystallization rate, produced by Epaflex Polyurethanes S.P.A.

[5] Sipolprene® 25170: TPE-C, an ether ester thermoplastic elastomer, manufactured by Sipol S.P.A., with a nominal hardness of Shore D 27 and a rheological behaviour, which makes it suitable for injection moulding and extrusion processing

[6] DuPure® T 50: a polypropylene homopolymer produced with a phthalate-free catalyst and having a high flowability, produced by Ducor Petrochemicals B.V.

[7] RAJOL® WP 350: a white mineral oil/liquid paraffin which is certified to be safe for incidental contact with food stuff, produced by Raj Petro Specialities (Europe) B.V.

[8] SCONA® TSKD 9103: a compatibilizer/adhesion promoter for TPE-S; a styrene ethylene butylene styrene block copolymer functionalized with maleic anhydride, produced by BYK-Chemie GmbH

[9] SCONA® TPPP 8112: a compatibilizer/adhesion promotor for TPE-S; a polypropylene functionalized with maleic anhydride, produced by BYK-Chemie GmbH

[10] Sipolprene® 35180: TPE-C, an ether ester thermoplastic elastomer, manufactured by Sipol S.P.A., with a nominal hardness of Shore D 35 and a rheological behaviour, which makes it suitable for injection moulding and extrusion processing 11) SEPTON™ 4077: TPE-S, a styrene-ethylene-ethylene-propylene-styrene-block-copolymer (SEEPS) material, product of Kuraray Co. Ltd.
12) Calcilit 7G: calcium carbonate made from bright white marble rock of high chemical purity, product of Alpha Calcit Füllstoff GmbH & Co. KG
13) PlusTalc H15: a Mg silicate based crystalline product (particles), improves brightness and mechanical reinforcement, product of Mondo Minerals BV
14) BURGESS ICEBERG™: "a general purpose" kaolin clay, offering a good balance of optical and mechanical properties, product of Burgess Pigment Co.

Substrates Used for the Adhesion Tests:
ABS: acrylonitrile-butadiene-styrene polymer (Terlux 2802 TR)
PC: polycarbonate (Calibre 201-22)
PET: polyethylene terephthalate (Sky green S2008)

The adhesion between the two relevant components is arranged by a corresponding injection molding process without a pre-treatment of the two adhesion partners.

The used components were predried in a commercially general way before processed in the injection molding process. The harder components were separately injection molded and afterwards preheated at 70° C. for 2 h and put into a cavity. Then the composition according to the present invention was applied by injection molding. The used injection molding apparatus was a "Engel Victory VC 330".

Testing of the adhesion is performed according to VDI guideline 2019 as 90°-peel test using a zwick tensile testing machine. The evaluation of the peeling curve is made due to DIN ISO 6133 (norm for testing the tear propagation resistance of elastomers).

Rating of the Adhesion:
<10 N: no adhesion
10-20 N: weak adhesion
20-60 N: good adhesion
>60 N: very good adhesion
further test norms:

| Shore hardness A | ASTM D 2240, 5 s |
| --- | --- |
| Compression set (25% compression): | |
| 23° C., 22 h; [%] | ISO 815 |
| 70° C., 22 h; [%] | ISO 815 |
| 100° C., 22 h; [%] | ISO 815 |
| Melt flow index; [g/10 min] | ISO 1133 |

The invention claimed is:

1. A thermoplastic elastomer composition comprising a mixture of
   5-50 wt. % of a block copolymer type thermoplastic polyurethane elastomer (TPE-U),
   5-50 wt. % of a block copolymer type thermoplastic co-polyester elastomer (TPE-C), wherein at least 70 wt. % of the TPE-C is represented by TPE-C comprising a block copolymer of alternating hard and soft blocks, wherein the soft blocks contain ester and ether linkages and structural units of aromatic dicarboxylic acids, and
   10-60 wt. % of a thermoplastic styrenic block copolymer (TPE-S),
   wherein wt. % is based on the total content of the elastomer composition.

2. The thermoplastic elastomer composition of claim 1, wherein the sum of the contents of the TPE-U, the TPE-C, and the TPE-S is 40-100 wt. %.

3. The thermoplastic elastomer composition of claim 1, wherein the sum of the contents of the TPE-U and the TPE-C is 30-60 wt. %.

4. The thermoplastic elastomer composition of claim 1, wherein the proportion of the contents of the TPE-U and the TPE-C is 1:5-5:1.

5. The thermoplastic elastomer composition of claim 1, wherein the content of the TPE-S is 22-50 wt. %.

6. The thermoplastic elastomer composition of claim 1, wherein
   the mixture also comprises one or more further ingredients.

7. The thermoplastic elastomer composition of claim 1, the thermoplastic elastomer composition having a shore hardness in the range from A20 up to D50.

8. The thermoplastic elastomer composition of claim 1, wherein at least 70 wt. % of the TPE-U is represented by TPE-U having a linear structure.

9. The thermoplastic elastomer composition of claim 1, wherein at least 90 wt. % of the TPE-S is represented by a A-B-A triblock copolymer wherein the A block contains structural units derived from styrene and the B block contains structural units derived from one or more of butadiene, isoprene, and isobutene.

10. An article comprising two different polymeric materials directly connected with each other, one of the two different polymeric materials including a thermoplastic elastomer composition comprising a mixture of:
    5-50 wt. % of a block copolymer type thermoplastic polyurethane elastomer (TPE-U),
    5-50 wt. % of a block copolymer type thermoplastic co-polyester elastomer (TPE-C), wherein at least 70 wt. % of the TPE-C is represented by TPE-C comprising a block copolymer of alternating hard and soft blocks, wherein the soft blocks contain ester and ether linkages and structural units of aromatic dicarboxylic acids, and
    10-60 wt. % of a thermoplastic styrenic block copolymer (TPE-S),
    wherein wt. % is based on the total content of the elastomer composition.

11. The article of claim 10, wherein the other polymeric material of the two different polymeric materials comprises a polar polymer component.

12. A method of preparing an article that comprises two different polymeric materials, the method comprising:
    directly connecting surfaces of the two different polymeric materials without pre-treatment,
    wherein one of the two different polymeric materials is a thermoplastic elastomer composition comprising a mixture of:
      5-50 wt. % of a block copolymer type thermoplastic polyurethane elastomer (TPE-U),
      5-50 wt. % of a block copolymer type thermoplastic co-polyester elastomer (TPE-C), wherein at least 70 wt. % of the TPE-C is represented by TPE-C comprising a block copolymer of alternating hard and soft blocks, wherein the soft blocks contain ester and ether linkages and structural units of aromatic dicarboxylic acids, and
      10-60 wt. % of a thermoplastic styrenic block copolymer (TPE-S),
      wherein wt. % is based on the total content of the elastomer composition.

13. The thermoplastic elastomer composition of claim 6, wherein the one or more further ingredients includes one or more of a compatibilizer, a polyolefin, a plasticizer, and a filler.

14. The article of claim 11, wherein the polar polymer component comprises one or more of a polycarbonate (PC), a polyethylene terephthalate (PET), an acrylonitrile-butadiene-styrene polymer (ABS), and a polyamide (PA).

15. The method of claim 12, wherein the article is prepared by injection molding.

16. The thermoplastic elastomer composition of claim 1, comprising, as the TPE-S, 10-60 wt. % of one or more of SEBS and SEEPS.

17. The thermoplastic elastomer composition of claim 1, wherein the elastomer composition comprises no oil or oil in an amount below 15 wt. % based on the total content of the elastomer composition.

18. The thermoplastic elastomer composition of claim 1, wherein the elastomer composition comprises, as the TPE-S, 10-60 wt. % of SEEPS, and the elastomer composition comprises no oil or oil in an amount below 15 wt. % based on the total content of the elastomer composition.

\* \* \* \* \*